United States Patent [19]

Nakamura et al.

[11] Patent Number: 5,077,348

[45] Date of Patent: Dec. 31, 1991

[54] AQUEOUS COATING COMPOSITION, PROCESS FOR THE PRODUCTION THEREOF AND AQUEOUS COATING

[75] Inventors: Tetsuhisa Nakamura, Higashimurayama; Akira Inoue; Masanori Ueno, both of Kawagoe; Isamu Ohno, Hidaka, all of Japan

[73] Assignee: Toyo Ink Manufacturing Co., Ltd., Tokyo, Japan

[21] Appl. No.: 680,778

[22] Filed: Apr. 20, 1991

Related U.S. Application Data

[63] Continuation of Ser. No. 186,296, Apr. 26, 1988, abandoned.

[51] Int. Cl.$^5$ ............................................. C08L 61/00
[52] U.S. Cl. ...................................... 524/512; 524/542
[58] Field of Search ................................ 524/512, 542

[56] References Cited

U.S. PATENT DOCUMENTS

| | | | |
|---|---|---|---|
| 4,062,823 | 12/1977 | Cheung et al. | 524/389 |
| 4,496,694 | 1/1985 | Forgo et al. | 524/542 X |
| 4,654,398 | 3/1987 | McFadden | 524/512 |
| 4,711,944 | 12/1987 | Sherwin et al., | 524/512 X |
| 4,783,497 | 11/1988 | Thompson | 524/542 X |
| 4,808,656 | 2/1989 | Kania et al. | 524/512 |
| 4,900,774 | 2/1990 | Mitsuji et al. | 524/512 |
| 4,900,774 | 2/1990 | Shindow et al. | 524/512 X |

FOREIGN PATENT DOCUMENTS 1530880 11/1978 United Kingdom .

*Primary Examiner*—Joseph L. Schofer
*Assistant Examiner*—J. M. Reddick
*Attorney, Agent, or Firm*—Wenderoth, Lind & Ponack

[57] ABSTRACT

An aqueous coating composition comprised of an aqueous resin obtained by neutralizing, with a volatile base, a copolymer comprised of (a) 5 to 65% by weight of hydroxyalkylacrylate or methacrylate in which the alkyl group has 1 to 5 carbon atoms,
(b) 5 to 50% by weight of diacrylate or dimethacrylate of alkylene glycol or polyoxyalkylene glycol,
(c) 2 to 20% by weight of $\alpha,\beta$-monoethylenically unsaturated carboxylic acid, and
(d) 20 to 88% by weight of a vinyl monomer copolymerizable with the above components (a), (b) and (c), and an aqueous amine formaldehyde condensate; and a process for the production of the above aqueous coating composition which comprises copolymerizing the above components (a) to (d) in an organic solvent in the presence of a polymerization initiator to convert these components to a precrosslinked ungelled copolymer, neutralizing said copolymer by adding a volatile base to obtain an aqueous resin, then mixing an aqueous amineformaldehyde condensate with said aqueous resin and thereafter distilling off the organic solvent.

9 Claims, No Drawings

AQUEOUS COATING COMPOSITION, PROCESS FOR THE PRODUCTION THEREOF AND AQUEOUS COATING

This application is a continuation of now abandoned application, Ser. No. 07/186,296 filed on Apr. 26, 1988.

FIELD OF THE INVENTION

This invention relates to an aqueous coating composition which comprises incorporating an aqueous aminoplast resin into an aqueous resin obtained by rendering aqueous with an organic amine, etc., a copolymer comprised of hydroxyl-group-containing alkyl(meth)acrylate, di(meth)acrylate of glycol or polyoxyalkylene glycol, $\alpha, \beta$ monoethylenically unsaturated carboxylic acid and a vinyl monomer copolymerizable therewith, a process for the production of the aqueous coating composition and an aqueous coating. Especially, it relates to an aqueous coating composition which is excellent in water resistance and gloss and in which its solvent content is reduced, a process for the production thereof and an aqueous coating.

DESCRIPTION OF THE PRIOR ART

The outer surfaces of beverage cans containing soft drinks, etc., and food cans containing food are covered with coatings which prevent corrosion of the can materials, enhance the aesthetic goods value and can withstand the heat treatment in food sterilization treatment. In these conventional coatings, organic-solvent-containing solutions of epoxy/amino type resin, acryl-/amino type resin, polyester/amino type resin, etc., are coated by a roll coater and the coatings are baked hard in a gas oven. However, these coatings cause volatilization of a large amount of solvents at the baking time, give rise to air pollution, and further, are undesirable from the viewpoint of resource saving. Accordingly, it has been desired to develop aqueous coatings which can solve these problems.

Known aqueous coatings are classified into two types water-dispersible and water-soluble. Many of the water-dispersible type coatings are usually synthesized by an emulsion polymerization method using a surfactant and therefore, have the defect that the surfactant used remains in a formed coating and lowers water resistance. On the other hand, there is a process which comprises synthesizing acid-content (carboxyl group)-containing resins in an organic solvent instead of using any surfactant, and neutralizing the resins with a volatile base to render them dispersible or water-soluble materials. However, these aqueous coatings require an acid content of not less than 20 of acid value in a basic resin structure, and have the defect that they are inferior in water resistance, alkali resistance, etc., i.e., they lack the basic coating properties.

Further, avoidance of the above-mentioned defects has led to a proposal of an aqueous coating in which the content of $\alpha, \beta$-monoethylenically unsaturated carboxylic acid is reduced to 3 to 10% by using a monoacrylic ester of glycol such as mono(meth)acrylates of polyethylene glycol (Japanese Patent Publication No. 1735/1977).

This aqueous coating has advantages that water resistance is improved and that it is excellent in alkali resistance and antirust strength. However, it has a defect of being inferior in coating properties, such as softening of a coated film, occurrence of blisters, decrease of gloss, etc., which are caused by severe heat treatment with boiling water, retort at 117° C. to 125° C., etc., used in food sterilization treatment of beverage cans, food cans, etc.

Further, the outer surfaces of beverage cans and food cans have to be coated with coatings having excellent gloss in order to enhance the aesthetic goods value. However, the above coating has not reached such a level as would meet the requirement.

The conventional aqueous coatings contain not less than 10% by weight of an organic solvent for storage stability of the coatings and improvement of leveling property in formation of the coatings. Accordingly, they are insufficient in terms of air pollution and resource saving with regard to solvent volatilization at the baking time.

SUMMARY OF THE INVENTION

It is an object of this invention to provide an aqueous coating composition which can give a coating excellent in water resistance and antirust, a process for the production thereof and such an aqueous coating.

It is another object of this invention to provide an aqueous coating composition which can give a coating having water resistance and withstandability against heat treatment at the time of food sterilization treatment of beverage cans and food cans, a process for the production thereof and such an aqueous coating.

It is yet another object of this invention to provide an aqueous coating composition which can give a coating so excellent in gloss as to increase the aesthetic goods value, a process for the production thereof and such an aqueous coating.

Further, it is still another object of this invention to provide an aqueous coating composition which has a small organic solvent content, a process for the production thereof and such an aqueous coating.

This invention provides an aqueous coating composition comprised of an aqueous resin obtained by neutralizing with a volatile base, a copolymer comprised of (a) 5 to 65% by weight of hydroxyalkylacrylate or methacrylate in which the alkyl group has a carbon number of 1 to 5, (b) 5 to 50% by weight of diacrylate or dimethacrylate of alkylene glycol or polyoxyalkylene glycol, (c) 2 to 20% by weight of $\alpha,\beta$-monoethylenically unsaturated carboxylic acid, and (d) 20 to 88% by weight of a vinyl monomer copolymerizable with the above compounds (a), (b) and (c), and an aqueous amine formaldehyde condensate.

Moreover, this invention provides a process for the production of an aqueous coating composition which comprises copolymerizing the above components (a), (b), (c) and (d) in an organic solvent in the presence of a polymerization initiator to convert these components to a precrosslinked ungelled copolymer, neutralizing said copolymer by addition of a volatile base to obtain an aqueous resin, then mixing said aqueous resin with an aqueous amine formaldehede condensate, and thereafter, distilling the organic solvent off.

Furthermore, this invention provides an aqueous coating comprised of the above aqueous resin and aqueous amine formaldehyde condensate.

DETAILED DESCRIPTION OF THE INVENTION

The composition of this invention is described more in detail hereinbelow.

Examples of the component (a), i.e., $C_1$–$C_5$ hydroxyalkylacrylate or methacrylate of this invention, are hydroxymethylacrylate, hydroxyethylacrylate, hydroxypropylacrylate, hydroxyamylacrylate, hydroxybutylacrylate and methacrylates corresponding thereto. Preferably used are hydroxymethylacrylate, hydroxyethylacrylate and methacrylates corresponding thereto.

The component (b), i.e., diacrylate or dimethacrylate of alkylene glycol or polyoxyalkylene glycol, is represented by the following general formula.

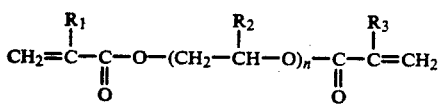

wherein $R_1$, $R_2$ and $R_3$ represent H or $CH_3$ and n represents an integer of from 1 to 50, preferably from 1 to 8.

More specifically, those represented by the above formula in which n is 1 to 8 are preferable, i.e., ethylene glycol diacrylate, diethylene glycol diacrylate, propylene glycol diacrylate, dipropylene glycol diacrylate, triethylene glycol diacrylate, tripropylene glycol diacrylate, tetraethylene glycol diacrylate, tetrapropylene glycol diacrylate, pentaethylene glycol diacrylate, pentapropylene glycol diacrylate, hexaethlene glycol diacrylate, hexapropylene glycol diacrylate and methacrylates corresponding thereto.

Examples of the component (c), i.e., $\alpha,\beta$-monoethylenically unsaturated carboxylic acid, are acrylic acid, methacrylic acid, crotonic acid, maleic acid, fumaric acid, itaconic acid, etc., and especially, preferable are acrylic acid and methacrylic acid.

Examples of the component (d), i.e., vinyl monomer copolymerizable with the above components (a) to (c), are alkylesters of acrylic acid or methacrylic acid such as ethyl acrylate, butyl acrylate, 2-ethylhexyl acrylate, cyclohexyl acrylate, ethyl methacrylate, butyl methacrylate, stearyl methacrylate and cyclohexyl methacrylate, aromatic vinyl compounds such as styrene, vinyl toluene and $\alpha$-methylstyrene, vinyl acetate, vinyl ethyl ether, etc.

The content of the component (a) in the copolymer resin is 5 to 65% by weight, preferably 5 to 20% by weight. If the content of the component (a) is smaller than the above lower limit, the number of crosslinkage points is not sufficient. As a result, the water resistance of the resultant coating is made inferior, and the coating stability is made insufficient since the number of hydrophilic groups is small. On the other hand, if the content of the component (a) is larger than the above upper limit, too large a number of crosslinkage points results in inferior flexibility of the resultant coating.

The component (b) is used in an amount of 5 to 50% by weight, of the copolymer resin. If the amount is less than the above lower limit, the precrosslinkage effect can not rather be obtained, and the improvement of water resistance is poor. If the amount is more than the above upper limit, the flexibility is made inferior. The above range is one in which the improvement of water resistance and the flexibility can be well balanced.

The content of the component (c) in the copolymer resin is 2 to 20% by weight, preferably 5 to 15% by weight. As far as the coating composition is rendered aqueous, the smaller the content is, the better the water resistance is. This purpose can be achieved if the content is not less than the above lower limit. However, if the content xceeds the above upper limit, the water resistance is made insufficient. Further, incorporation of the component (d) in the range from 20 to 88% by weight in the copolymer makes it possible to adjust the coating hardness and flexibility of the composition.

The copolymer of this invention can be obtained in the form of a precrosslinked ungelled copolymer by copolymerizing the above components (a) to (d) in an organic solvent by the use of peroxide or azo compound as a catalyst. Examples of the peroxide include benzoyl peroxide, acetyl peroxide, succinic acid peroxide, m-toluoryl peroxide, t-butyl peroxy-2-ethylhexanoate, t-butyl peroxyisobutylate, 1-1-bis(t-butylperoxy)3,3,5-trimethyl cyclohexane, lauroyl peroxide, etc. Examples of the azo compound include 2,2'-azobisisobutylonitrile, dimethyl-2,2'-azobisisobutylate, 2,2'-azobis-2,4-dimethylbaleronitrile, 4,4'-azobis-4-cyanovaleric acid, 1,1'-azobiscyclohexane carbonitrile, etc.

The synthesis of the copolymer without gellation can be carried out at a temperature of 90° to 120° C. in a comparatively low polymerization solid content of not more than 50% by weight, preferably 30 to 45% by weight. The resulting copolymer solution scarcely exhibits ultraviolet ray absorption as compared with those before the polymerization. This fact also shows that the charged monomers have been entirely copolymerized under the above conditions, and it is surprising that the precrosslinkage without gellation is possible.

The copolymer comprised of the above four components is rendered aqueous by the use of ammonia or organic amine. Examples of the organic amine include monoethanol amine, dimethyl amine, diethyl amine, triethyl amine, triethanol amine, diethyl ethanol amine, dimethylethanol amine, diethylethanol amine, etc.

After the copolymer is rendered aqueous or after an aqueous aminoplast resin is incorporated, the organic solvent in the solution is distilled off at reduced pressure of about 50 to about 200 torr at a temperature in the range from 40° to 80° C. to give a water-soluble or water-dispersible resin solution.

For this reason, in view of the distilling-off at a post-step, it is preferable to use, in the synthesis, an organic solvent having a boiling point of not higher than 180° C. When consideration is given to temperatures at the synthesis time and solubility of the copolymer in an organic solvent, it is desirable to use a solvent having a boiling point in the range from 75° to 180° C.; Examples of such a solvent are alcohol-type solvents such as isopropyl alcohol, n-butanol, isobutyl alcohol, n-amyl alcohol, isoamyl alcohol, etc., and an ether-type solvents such as ethylene glycol monomethyl ether, ethylene glycol monoethyl ether, ethylene glycol monoisopropyl ether, ethylene glycol monobuthyl ether.

As the aqueous amine formaldehyde condensate in this invention, used alone or in combination are alkyletherified melamine resin, alkyletherified urea resin, alkyletherified guanamine resin, alkyletherified resin of diguanamine in which two triazine rings are bonded to its phenylene nucleus, and alkyletherified glycol resin, alkyletherified guanamine resine. Completely etherified hexamethoxymelamine is preferably used.

The aqueous resin which the aqueous-rendering treatment has rendered water-soluble or water-dispersible is converted to a coating by mixing it with an aqueous aminoplast resin and optionally adding 0.1 to 1.0 part by weight, based on 100 parts by weight of resin solid content, of an amine-blocked acid catalyst as a curing agent such as p-toluene benzene sulfonic acid, dodecylbenzene sulfonic acid, dinonyl naphthalene disulfonic acid. It is also possible to incorporate thereinto a water-soluble resin and/or water-dispersible resin generally used as a resin for an aqueous coating resin. Examples of such a resin are water-soluble polyester resin, maleic acid-added fatty acid, water-soluble or water-dispersible epoxy resin, polyol such as bisphenol-A propylene oxide adduct, ethylene oxide adduct, etc., and the like.

Similarly, it is also possible to add a levelling agent, antifoaming agent and/or lubricating agent. Further, when a pigment paste is prepared by mixing and kneading a pigment with the aforesaid copolymer resin solution from which the solvent is removed, the pigment paste can be also converted to a coating in a similar way to that mentioned above.

The aqueous coating composition of this invention can be applied by known means such as roll coat, spray, brush, etc.

The aqueous coating composition of this invention has water resistance capable of withstanding the heat treatment carried out at the time of sterilizing cans to be used for food and beverage. It also forms a coated film having excellent gloss increasing the aesthetic value of can material and has excellent coating stability and flow coating capability even when the organic solvent content is not more than 5% based on the entirety of coating composition.

The following examples illustrate this invention in detail In the examples, "part" stands for "part by weight" and "%" stands for "% by weight".

EXAMPLES

Preparation Example A1

Preparation Example of an acryl resin solution 100 parts of n-butanol was charged to a 4-neck flask having a thermometer, stirrer, reflux condenser, dropping funnel and nitrogen gas flowing tube, and, with stirring and with keeping the temperature at 100° C. while a nitrogen gas was being introduced, added dropwise over 3 hours from the dropping funnel was a mixture of 15 parts of 2-hydroxyehtyl acrylate, 20 parts of tetraethylene glycol diacrylate, 2 parts of acrylic acid, 63 parts of ethyl acrylate and 2 parts of benzoyl peroxide. Then, the reaction was continued for 2 hours by keeping the temperature at 100° C. and thereafter 0.3 part of benzoyl peroxide was added to continue the reaction for 1 hour.

The resulting product was cooled to not higher than 40° C. and 3 parts of triethyl amine and 200 parts of water were added to give a clear viscous resin solution having 60% of a solid content and 10% of residual n-butanol.

Preparation Examples A2–A6

Synthesis was carried out according to the procedure of Preparation Example A1 by changing the solvent composition which was to be precharged into a flask, the vinyl monomer composition to be added dropwise, the catalyst amount, the catalyst amount to be additionally added and the reaction temperature as shown in Table 1, and further, the synthesized product was neutralized with an organic amine of which the amount was changed as shown in Table 1.

According to the procedure of Preparation Example A1, water was added to distill off the synthesis solvent together with the water under reduced pressure at 80° C. to give a clear viscous resin solution having 60% of solid content and 10° C. of residual n-butanol.

Preparation Example B1

Preparation Example of pigment-dispersed paste 40 parts of an acryl resin solution A1, 40 parts of rutile-type titanium white and 10 parts of water were mixed, and the mixture was dispersed by an attritor to give a pigment dispersed paste.

Preparation Example B2

40 parts of an acryl resin solution A2, 40 parts of rutile-type titanium white and 10 parts of water were mixed, and the mixture was dispersed by an attritor to give a pigment dispersed paste.

Example 1

47 parts of an acryl resin solution of Preparation Example A1, 12 parts of hexamethoxy melamine (product of Mitsui Toatsu Chemical Co., Ltd: named as SIMEL 303; the same is used in Examples hereinafter), 0.4 part of amine-blocked p-toluene sulfonic acid (product of Kusumoto Chemical Co., Ltd: named as NACURE 2500X; the same is used in Examples hereinafter) and 40.6 parts of water were mixed to convert them to a coating.

Examples 2–8

Example 1 was repeated except that the acryl resin solution and aqueous aminoplast resin were changed as shown in Table 2, and the mixture was converted to a coating.

Example 9

6.3 parts of an acryl resin solution of Preparation Example A1, 62.5 parts of a pigment-dispersed paste of Preparation Example B1, 6.3 parts of hexamethoxy melamine, 0.2 parts of amine-blocked p-toluene sulfonic acid and 24.7 parts of water were mixed to convert them to a coating.

Example 10

6.3 parts of an acryl resin solution of Preparation Example A2, 62.5 parts of a pigment-dispersed paste of Preparation Example B2, 6.3 parts of hexamethoxy melamine, 0.2 part of amine-blocked p-toluene sulfonic acid and 24.7 parts of water were mixed to convert them to a coating.

Comparative Examples 1–2

The following are Comparative Examples 1 and 2 with regard to a coating consisting of a known aqueous acryl resin and an aqueous aminoplast resin and a white coating in which a pigment-dispersed paste is dispersed.

Comparative Example 1

40 parts of butyl cellosolve was charged into a four-neck flask, and with stirring and with keeping the temperature at 115° C. while a nitrogen gas was being introduced, added dropwise over 3 hours from a dropping funnel a mixture of 20 parts of acrylic acid, 50 parts of ethyl acrylate, 25 parts of methyl methacrylate, 5 parts of hydroxyethyl acrylate and 1 part of benzoyl peroxide.

Then, by keeping the temperature at 115° C. for 2 hours, the reaction was continued, and thereafter 0.1 part of benzoyl peroxide was added to continue the reaction for 1 hour. The reaction product was cooled to 70° C. and diluted with 60 parts of isopropyl alcohol, and further, the mixture was diluted with 25 parts of triethyl amine and 30 parts of water to give an acryl resin solution.

42.9 parts of hexamethoxy melamine, 1.9 parts of amine-blocked p-toluene sulfonic acid and 164 parts of water were mixed with the above acryl resin solution to convert them to a coating.

Comparative Example 2

55 parts of an acryl resin solution obtained in Comparative Example 1, 40 parts of rutile-type titanium white and 5 parts of water were mixed, and dispersed by an attritor. Then, mixed further therewith were 12.5 parts of an acryl resin solution obtained in same, 10 parts of hexamethoxy melamine, 0.4 part of amine-blocked p-toluene sulfonic acid and 37.1 parts of water to convert the mixture to a coating.

Comparative Example 3

33 parts of butylcellosolve was charged into a four-neck flask similar to one described in Preparation Example A1, and, with stirring and with keeping the temperature at 120° C., there was added dropwise from a dropping funnel over 2 hours a mixture of 5 parts of acrylic acid, 15 parts of 2-hydroxyethylmethacrylate, 15 parts of polypropyleneglycol monomethacrylate, 40 parts of styrene, 24 parts of butylacrylate and 0.8 part of benzoyl peroxide. Thereafter, the reaction was continued at 120° C. for 3 hours, and 0.2 part of benzoyl peroxide was added to continue the reaction for 1 hour. Then the reaction was stopped. The reaction product was cooled to 70° C., diluted with 33 parts of isopropyl alcohol, and further diluted with 10 parts of triethylamine and 24 parts of water to give an acryl resin solution.

By the use of the above acryl resin solution, Example 1 was repeated to give a clear-type coating.

Comparative Example 4

By the use of an acryl resin of Comparative Example 3 and a titanium pigment-dispersed paste prepared in the same way as in Preparation Example B1, a white-color coating was obtained by repeating the procedure of Example 9.

With regard to each of coatings obtained in Examples 1 to 10 and Comparative Examples 1 to 4, a coating test, test of coated film property after coated and baked, and test of flow coating property were carried out. The results are shown in Table 3.

Method of each of the above tests is as follows.

Coating Test

Test on coating stability

Each of the coatings was stored at room temperature for 2 months, and then the state of gellation and separation of resin was observed.

Test on organic solvent content in coating

Each of the coatings was diluted with methyl-ethyl ketone, and the content was directly determined by gas chromatography.

Test of coated film property

Each of the coatings was coated on an electroplated tin plate having a thickness of 0.23 mm was coated by roll coat such that the thickness of a dried coated film had a thickness of 7 μm, and the coated plate was baked in a gas oven at an ambient temperature of 190° C. for 10 minutes to make a baking-finish panel.

Test on water resistance

A coated panel was immersed in water and heat-treated at 100° C. for 30 minutes, and then the whitened state of a coated film was evaluated.

Test by pencil hardness

Evaluation was made according to pencil hardness test method on the basis of JIS No. K 5400 standard.

Test on intimate adhesion property

A coated surface was cut crosswise at the intervals of 2 mm in 11 lines along both lengh and breadth such that the cut reached the substrate. Then an adhesive tape was applied over to the surface and detached therefrom to determine the proportion of peeling of cross-cut sections.

Test on impact strength

By the use of a du Pont impact tester, a pin was brought into contact with a sample and a load of 500 g was dropped thereon. Impact resistance was evaluated by a height at which no crack was caused on a coated film.

Gloss

Mirror reflectivity was measured at measurement angle of 60°. With regard to clear-type coating, the measurement was made after it was coated on a baked coated film of a white coating of Example 9 on a plate.

Antirust property

Cross-cut was given to a coated film surface of a plate as deep as it reached the plate, salt water was sprayed thereover, and the plate was left to stand for 72 hours. Cut portions were peeled off with an adhesive tape, and evaluation was made in terms of peeled area.

Coating property test

Flow:

Immediately after a sample was coated by a roll coater, the coated sample was baked in an oven, and the flow state of coating was evaluated.

TABLE 1

| Preparation Example of Acryl Resin Solution | | | | | | |
|---|---|---|---|---|---|---|
| | A1 part | A2 part | A3 part | A4 part | A5 part | A6 part |
| MONOMER COMP. | | | | | | |
| Hydroxyethyl acrylate | 15 | | | | 20 | |
| Hydroxyethyl methacrylate | | 10 | | 15 | | 60 |
| Hydroxypropyl methacrylate | | | 40 | | | |
| Diethyleneglycol diacrylate | 20 | 20 | 10 | | | |
| Tetraethylene diacrylate | | | | 45 | | |
| Polyethyleneglycol dimethacrylate* | | | | | 10 | 10 |
| Acryl acid | 3 | 5 | | | | |
| Methacryl acid | | | 10 | 18 | 10 | 5 |
| Ethylacrylate | 62 | 75 | | | | |
| Methylmethacrylate | | | 40 | | 60 | |
| Styrene | | | | 32 | | 25 |
| SOLVENT | | | | | | |
| n-Butanol | 100 | | 100 | 60 | | |
| Ethyleneglycol monoethylether | | 100 | | 60 | | 100 |
| n-Amylalcohol | | | | | 100 | |
| CATALYST | | | | | | |
| Peroxybenzoyl (additional) | 2.2 (0.2) | 2.2 (0.2) | 4.4 (0.4) | | 2.2 (0.2) | 2.2 (0.2) |
| Azoisobutylo nitrile (additional) | | | | 2.2 (0.2) | | |
| Reaction temp. °C. | 100 | 100 | 95 | 100 | 120 | 95 |
| AMINE | | | | | | |

TABLE 1-continued

Preparation Example of Acryl Resin Solution

| | A1 part | A2 part | A3 part | A4 part | A5 part | A6 part |
|---|---|---|---|---|---|---|
| Triethylamine | 3 | 7.5 | 12 | | 12 | |
| Dimethylethanol amine | | | | 21 | | 5.5 |

*Newfrontier 250Z produced by Daiichi Kogyo Seiyaku Co., Ltd.

TABLE 2

Examples of Coating Conversion

| | Ex. 1 part | Ex. 2 part | Ex. 3 part | Ex. 4 part | Ex. 5 part | Ex. 6 part | Ex. 7 part | EX. 8 part |
|---|---|---|---|---|---|---|---|---|
| Prep. Ex. A1 | 47 | 40 | | | | | | |
| Prep. Ex. A2 | | | 47 | 40 | | | | |
| Prep. Ex. A3 | | | | | 47 | | | |
| Prep. Ex. A4 | | | | | | 47 | | |
| Prep. Ex. A5 | | | | | | | 47 | |
| Prep. Ex. A6 | | | | | | | | 47 |
| CYMEL303 | 12 | 16 | 12 | 16 | 12 | 12 | 12 | 12 |
| NACURE 2500X | 0.4 | 0.4 | 0.4 | 0.4 | 0.4 | 0.4 | 0.4 | 0.4 |
| Water | 40.6 | 40.6 | 40.6 | 43.6 | 40.6 | 40.6 | 40.6 | 40.6 |

CYMEL303: hexamethoxymelamine (produced by Mitsui Toatsu Chemicals, Inc.)
NACURE 2500X: amine blocked p-toluene sufonic acid (Kusumoto kasei Co., Ltd.)

TABLE 3

Test Results

| | Example | | | | | | | | | |
|---|---|---|---|---|---|---|---|---|---|---|
| | 1 | 2 | 3 | 4 | 5 | 6 | 7 | 8 | 9 | 10 |
| COATING TEST | | | | | | | | | | |
| Coating stability | A | A | A | A | A | A | A | A | A | A |
| Organic solvent content % | 5 | 4 | 5 | 4 | 5 | 5 | 5 | 5 | 5 | 5 |
| TEST OF COATED FILM PROPERTY | | | | | | | | | | |
| Water resistace | | | | | | | | | | |
| 100° C. | B | B | B | B | B | B | B | B | B | B |
| 120° C. | C | B | C | B | C | C | C | C | C | C |
| Pencil hardness | 4H | 5H | 5H | 6H | 5H | 6H | 6H | 6H | 5H | 5H |
| Adhesion property | D | D | D | D | D | D | D | D | D | D |
| Impact strength cm | 40 | 30 | 40 | 30 | 30 | 25 | 30 | 25 | 30 | 30 |
| Gloss | 99 | 98 | 98 | 98 | 99 | 99 | 99 | 99 | 95 | 95 |
| Antirust property % | 3 | 2 | 2 | 2 | 3 | 3 | 3 | 3 | 3 | 3 |
| COATABILITY | | | | | | | | | | |
| Flow | A | A | A | A | A | A | A | A | A | A |

| | Comparative Example | | | |
|---|---|---|---|---|
| | 1 | 2 | 3 | 4 |
| COATING TEST | | | | |
| Coating stability | A | A | A | A |
| Organic solvent content % | 21 | 14 | 21 | 14 |
| TEST OF COATED FILM PROPERTY | | | | |
| Water resistace | | | | |
| 100° C. | *1 | *1 | *2 | *2 |
| 120° C. | *1 | *1 | *1 | *1 |
| Pencil hardness | 2H | 2H | 4H | 4H |
| Adhesion property | D | D | D | D |
| Impact strength cm | 40 | 30 | 30 | 30 |
| Gloss | 93 | 90 | 94 | 92 |
| Antirust property % | 80 | 80 | 4 | 5 |
| COATABILITY | | | | |
| Flow | A | *3 | A | *3 |

Note:
A; Excellent B; Acceptable C; Nearly acceptable D; No peeling
*1; Dissolved in water *2; All whitening *3; No good due to flow patterns

What we claim is:

1. An aqueous coating composition comprising an aqueous resin obtained by copolymerizing (a) 5 to 65% by weight of hydroxyalkylacrylate or methacrylate in which the alkyl group has 1 to 5 carbon atoms, (b) 5 to 50% by weight of diacrylate or dimethacrylate of polyoxyalkylene glycol, (c) 2 to 20% by weight of α,β-monoethylenically unsaturated carboxylic acid, and (d) 20 to 88% by weight of a vinyl monomer copolymerizable with the above components (a), (b) and (c), wherein said vinyl monomer is at least one member selected from the group consisting of alkyl ester of acrylic acid or methacrylic acid, styrene, vinyl toluene, α-methylstyrene, vinyl acetate and vinylethyl ether, in an organic solvent in the presence of a polymerization initiator to form a solution of a precrosslinked ungelled copolymer, and dissolving the solution of the precrosslinked ungelled copolymer in water in the presence of ammonia or an organic amine, and an aqueous amine formaldehyde condensate.

2. An aqueous coating composition according to claim 1 wherein the component (a) is 5 to 20% by weight, the component (b) is 7 to 25% by weight, the component (c) is 5 to 15% by weight and the component (d) is 40 to 83% by weight.

3. An aqueous coating composition according to claim 1 wherein the alkyl group of the component (a) represents at least one member selected from the group consisting of methyl, ethyl, propyl, butyl and amyl.

4. An aqueous coating composition according to claim 1 wherein the component (b) is a compound of formula

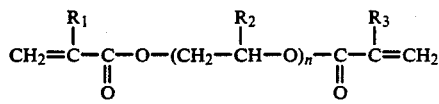

wherein $R_1$, $R_2$ and $R_3$ represent H or $CH_3$, and n represents an integer of 2 to 50.

5. An aqueous coating composition according to claim 4 wherein n in the formula of the component (b) represents an integer of 2 to 8.

6. An aqueous coating composition according to claim 1 wherein the component (c) represents at least one member selected from the group consisting of acrylic acid, methacrylic acid, crotonic acid, maleic acid, fumaric acid and itaconic acid.

7. An aqueous coating composition according to claim 1 wherein the alkyl ester of acrylic or methacrylic acid is at least one member selected from the group consisting of ethyl acrylate, butyl acrylate, 2-ethylhexyl acrylate, cyclohexyl acrylate, ethyl methacrylate, butyl methacrylate, stearyl methacrylate, and cyclohexyl methacrylate.

8. An aqueous coating composition according to claim 1 wherein the organic amine represents at least one member selected from the group consisting of, monoethanolamine, dimethylamine, diethylamine, triethylamine, triethanolamine dimethylethanolamine and diethylethanolamine.

9. An aqueous coating composition according to claim 1 wherein the aqueous amine formaldehyde condensate is at least one member selected from the group consisting of alkyletherified melamine resin, alkyletherified urea resin, alkyletherified guanamine resin, and alkyletherified resin of diguanamine in which 2 triazine rings are bonded to the phenylene nucleus.

* * * * *

UNITED STATES PATENT AND TRADEMARK OFFICE
CERTIFICATE OF CORRECTION

PATENT NO.   :   5,077,348
DATED        :   December 31, 1991
INVENTOR(S)  :   Tetsuhisa NAKAMURA, Akira INOUE, Masanori UENO, Isamu OHNO It is certified that error appears in the above-identified patent and that said Letters Patent is hereby corrected as shown below:

Col. 10, line 3, after "of" delete "," (comma).

Signed and Sealed this

Fifteenth Day of June, 1993

Attest:

MICHAEL K. KIRK

Attesting Officer

Acting Commissioner of Patents and Trademarks